Dec. 15, 1942. G. J. MORRIS 2,305,099
SECURING MEANS FOR VALVE STEMS
Filed Jan. 13, 1942
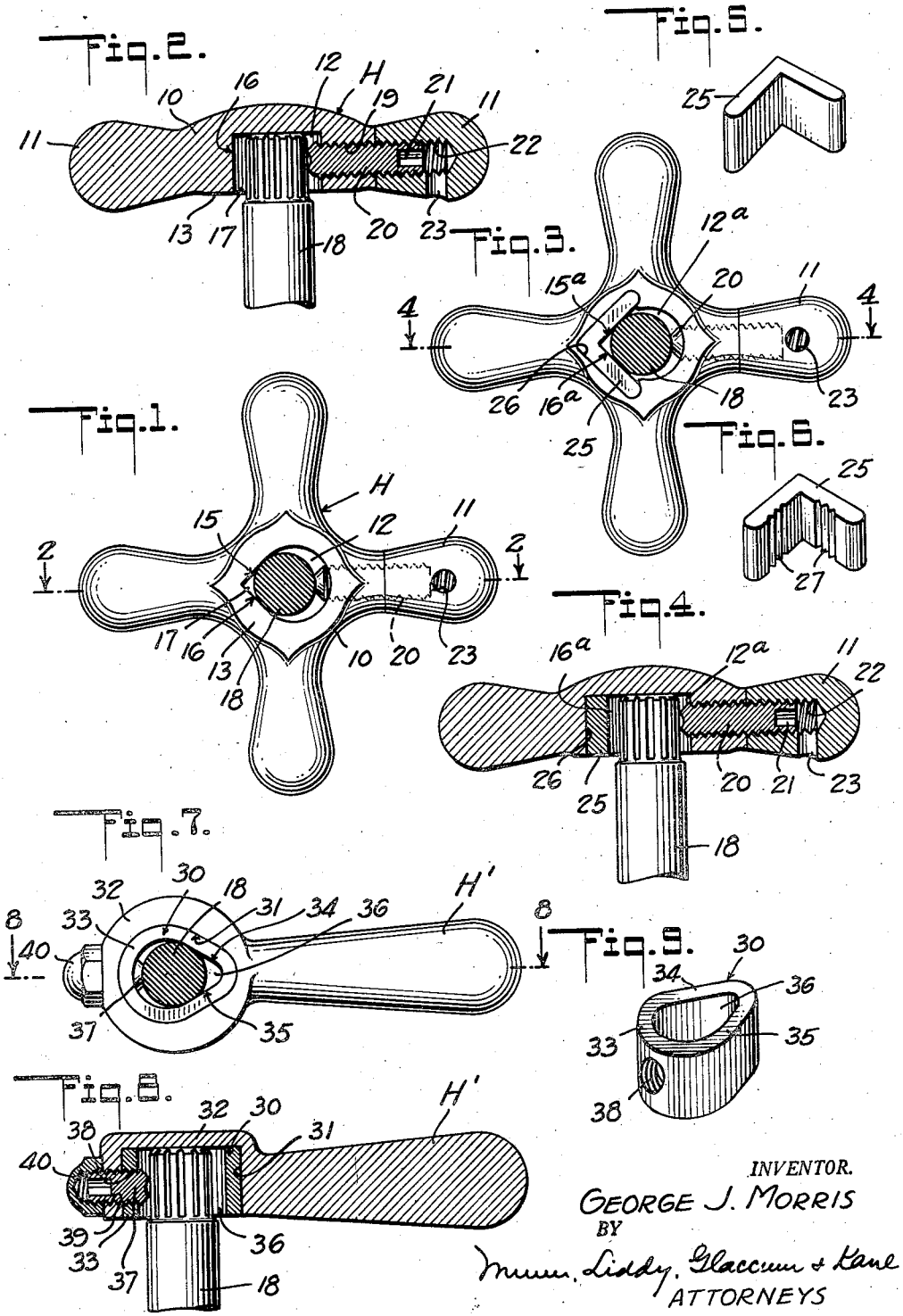
INVENTOR.
GEORGE J. MORRIS
BY
Liddy, Glaccum & Kane
ATTORNEYS Patented Dec. 15, 1942

2,305,099

UNITED STATES PATENT OFFICE 2,305,099

SECURING MEANS FOR VALVE STEMS

George J. Morris, Los Angeles, Calif.

Application January 13, 1942, Serial No. 426,649

4 Claims. (Cl. 287—53)

This invention relates generally to fastening devices, and more particularly to means for securing original or replacement handles, knobs and other forms of actuating members to shafts such as for example, the stems of valves of faucets, shower heads and other instrumentalities in plumbing installations.

An object of this invention is to provide means which is structurally characterized to enable a handle or other types of actuating member to be rigidly secured to a shaft such as the stem of a valve, in a manner to compensate for stems of different diameters and different cross sectional shapes with equal effectiveness, all while enabling the handle to be readily applied to any stem within a predetermined range of sizes met in practice, and to grip the stem with such security that an absolutely reliable connection between the stem and handle is assured.

Another object of the invention is to provide a fastening means of the above described character which embodies a single screw fastening member mounted in the handle or other form of actuating member to be applied to a stem, and cooperable with surfaces in the handle, functioning in the manner of a wedge to rigidly clamp the stem irrespective of variations in its diameter and cross sectional shape.

A further object of the invention is to provide a fastening means which is inexpensive to embody in the construction of a handle, knob, or other form of actuating member; which provides a concealed fastening; and which is adaptable to actuating members of different constructions and made of different materials such as die-cast metals or plastics, with respect to which the necessary structural strength to reinforce the material against fracture by the internal stress of the co-acting screw fastening element and cooperating wedge surfaces, is effectively attained.

With these and other objects in view, the invention resides in the combinations, arrangements and functional relationships of elements as set forth in the following specification and particularly pointed out in the appended claims.

In the accompanying drawing,

Figure 1 is a bottom plan view of a handle secured to a valve stem by one form of means embodying this invention;

Figure 2 is a sectional view taken on the line 2—2 of Figure 1;

Figure 3 is a view similar to Figure 1 and illustrating a modified form of the invention;

Figure 4 is a sectional view taken on the line 4—4 of Figure 3;

Figures 5 and 6 are perspective views of wedge inserts either of which can be utilized in the form of the invention illustrated in Figures 3 and 4;

Figure 7 is a bottom plan view of a handle member illustrating a further modified form of the invention particularly adapted, although not necessarily, for use with relatively weak structural materials such as plastics;

Figure 8 is a sectional view taken on line 8—8 of Figure 7;

Figure 9 is a perspective view of the wedge insert embodied in the form of the invention illustrated in Figures 7 and 8.

Referring specifically to the drawing and particularly to Figures 1 and 2, this form of the invention is embodied in a handle member H of die-cast metal or other suitable material having a hub portion 10 and one or more arms 11 of which four are shown equally spaced as illustrative.

The hub portion 10 contains a bore 12 opening only to the bottom or rear face 13 of the hub portion, which bore is oversize in a sense that it is capable of receiving valve stems of various diameters and cross sectional contours to a predetermined maximum met with in practice in plumbing installations as an example.

One of the arms 11 of the handle member H is constructed as a separate part thereof; and directly opposite such arm the wall of the bore 12 is defined by relatively and equally inclined surfaces 15 and 16 which co-act to present a wedging recess 17 to the perimetric surface of a valve stem 18 when inserted in the bore as shown in these figures. Directly opposite the apex of the recess, the hub portion 10 is provided with a radially extending threaded bore 19 in which is mounted a set screw 20 preferably of the type having a socket 21 therein at its outer end, adapted to receive a standard L-shaped socket wrench (not shown).

The set screw 20 is of such length that when tightened against a valve stem of a predetermined minimum diameter, a portion of the set screw will project from the handle member. The separate arm 11 above referred to, is provided with a longitudinal bore 22 threaded to receive the projecting portion of the set screw 20 so as to detachably secure the arm in its proper radial position on the hub portion 10 and thus conceal the fastening means formed by the set screw 20.

A transverse bore 23 is provided in the separate arm 11 to open to that side thereof at the bottom or rear face 13 of the hub portion, when the arm is tightened on the set screw as shown. A suitable small instrument or the socket wrench (not shown), can be inserted into the bore 23 so as to act as a lever and thus facilitate tightening and loosening the arm on the set screw.

When the set screw 20 is tightened against the valve stem 18 as shown, the stem will be jammed by the set screw into wedging engagement with the relatively inclined surfaces 15 and 16 so as to be rigidly clamped in the bore 12, whereby to secure the handle member to the stem with absolute security against rotation relative to the stem, and all without the use of any extraneous or exposed fastening means.

Reference will now be had to Figures 3 to 6 inclusive, in which is illustrated a second form of fastening means embodying this invention which is similar to the first form thereof with the exception that the relatively inclined surfaces 15 and 16 of the bore 10 are formed on a V-shaped insert 25 and are designated as 15a and 16a for co-action with a set screw 20 in the same manner as previously described. The insert 25 is of relatively hard metal as compared to the material from which the handle member is constructed, and can either be molded in place or inserted subsequently in a suitable recess 26 opening to the bore 12a as shown in Figure 3. The wedging surfaces 15a and 16a of the insert 25 can be relatively smooth as illustrated in Figure 5 or can be roughened by grooves 27 or other means as shown in Figure 6 so as to provide additional security against turning of the handle member on the stem should this be required.

Reference will now be had to Figures 7, 8 and 9 illustrating a third form of fastening means embodying this invention which is particularly adapted, although not necessarily, for use with handle members constructed of structurally weak materials such as plastics. This form of the invention comprises an insert 30 which is constructed of structurally strong metal and is non-circularly tubular so as to be a continuous band. The insert 30 is either molded or forced into a suitably shaped bore 31 in the hub portion 32 of the handle member H' which is illustrated as being of the single arm type. The insert, which has a relatively thick and rigid wall, has a generally semi-circular portion 33 merging into relatively inclined portions 34 and 35 defining therebetween a wedge-shaped recess 36 for co-action with a set screw 37 in jamming a valve stem into wedging engagement with the surfaces and thus secure the handle member rigidly to the valve stem. The set screw 37, which is of the socket type, is threaded through an opening 38 in the semi-circular portion 33 of the insert at a location directly opposite the portions 34 and 35, and through a registering opening 39 in the hub portion 32 so as to project from the latter as shown in Figure 8. A cap or finishing nut 40 is screwed onto the projecting portion of the set screw 37 so as to conceal the latter.

The thrust created by the set screw 37 when tightened against the valve stem, is effectively resisted by the insert sufficiently to prevent such deformation thereof as would fracture the hub portion 32, thus reinforcing the latter so as to permit the use of plastics and other substitute materials.

From the foregoing description, it will be manifest that all forms of the invention function with equal efficiency in rigidly securing a handle member to valve stems of various diameters in a substantially centered position irrespective of variations in the size and cross sectional contour of the valve stem, all by the firm clamping co-action of the single fastening member and the wedging surfaces in the handle member, upon the perimetric surface of the valve stem.

I claim:

1. Handle fastening means for shafts and stems of various diameters and cross sectional shapes comprising: a handle member having an oversize bore a portion of whose wall is defined by relatively inclined flat surfaces presenting a wedging recess to the perimetric surfaces of stems of various cross sectional contours and dimensions when inserted into the bore; a single screw fastener threadedly mounted in said member for adjustment to jam a stem into wedging engagement with said surfaces so as to rigidly clamp the stem in the bore; said member having manipulating means threadedly mounted on said screw fastener by which the latter is concealed from view in the applied position of the handle on the stem.

2. Handle fastening means for shafts and stems of various diameters and cross sectional shapes comprising: a handle member having an oversize bore; a tubular insert of relatively hard material non-rotatably fitting said bore and including relatively inclined surfaces presenting a wedging recess to the perimetric surfaces of stems of various cross sectional dimensions and contours when received in the bore; and a single screw fastener extending through said member and threadedly mounted in said insert at a location opposite said inclined surfaces for co-action therewith in rigidly clamping a stem in said bore.

3. Handle fastening means for shafts and stems of various diameters and cross sectional shapes comprising: a handle member having a manipulating arm separable therefrom; said member provided with an oversize bore a portion of whose wall is defined by wedge-forming surfaces; and a set screw threadedly mounted in said member at a location opposite said surfaces for co-action therewith in clamping a stem in the bore; said arm having a threaded bore and adapted to be screwed onto a projecting portion of said screw to conceal the latter and secure the arm to the handle member for manipulation thereof.

4. Handle fastening means for shafts and stems of various diameters and cross sectional shapes comprising: a handle member having a non-circular bore; a non-circular tubular insert fitting into said bore and having relatively inclined internal surfaces presenting a wedging recess to the perimetric portions of stems of various cross sectional dimensions and contours received in said insert; and a set screw mounted in the handle member and threaded through said insert to engage a stem at a location opposite said surfaces for co-action therewith in rigidly clamping the stem in the insert so as to secure the handle member on the stem; said insert having sufficient structural strength to resist deformation expansively under the stress imposed thereon by the set screw so as to reinforce and prevent fracture of the handle member.

GEORGE J. MORRIS.